Feb. 18, 1969 G. L. RUOFF 3,427,802
GAS STARTING ARRANGEMENT FOR TWO-CYCLE TURBOCHARGED ENGINE
Filed Aug. 31, 1966
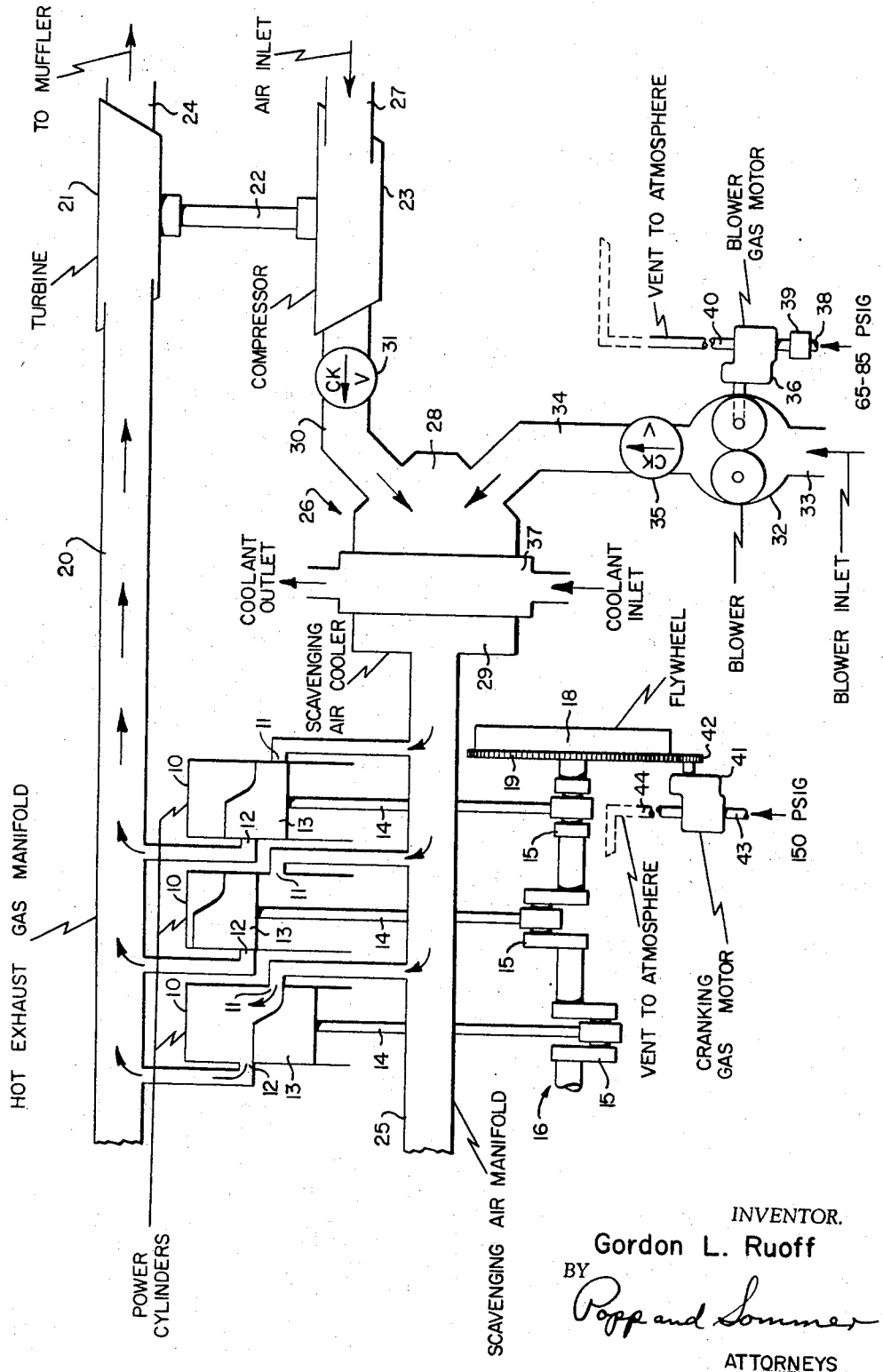
INVENTOR.
Gordon L. Ruoff
BY
Popp and Sommer
ATTORNEYS United States Patent Office 3,427,802
Patented Feb. 18, 1969

3,427,802
GAS STARTING ARRANGEMENT FOR TWO-CYCLE TURBOCHARGED ENGINE
Gordon L. Ruoff, Bradford, Pa., assignor to Dresser Industries, Inc., Dallas, Tex., a corporation of Delaware
Filed Aug. 31, 1966, Ser. No. 576,258
U.S. Cl. 60—13    2 Claims
Int. Cl. F02b *41/10, 33/22;* F02n *9/00*

ABSTRACT OF THE DISCLOSURE

A two-cycle engine includes an exhaust driven turbine compressor unit for supplying scavenging air to the engine cylinders, the scavenging air being directed to a chamber including an air cooler and then to the intake manifold of the engine. To provide scavenging air upon engine starting, an auxiliary positive displacement blower is provided for directing scavenging air to the air cooler chamber, in a path parallel to the flow path from the turbo-compressor. The auxiliary blower is driven by a gas motor supplied from an outside source. The conduits, on the downstream side of the blower and compressor, are provided with check valves to prevent backflow to these units. A second gas motor is coupled to the engine flywheel to crank the engine. A pressure regulator is associated with the blower gas motor to reduce the gas pressure supplied to this motor, when the two gas motors are connected to a common supply.

---

This invention relates to a gas starting arrangement for a two-cycle turbocharged engine which has an exhaust gas driven turbine for driving a centrifugal compressor for supplying scavenging air when the engine is self-sustaining.

Heretofore one technique for providing initial scavenging air at startup was to accelerate the turbocharger with intermittent jets of starting air directed against the turbine wheel. At the same time means were provided for cranking the engine by injecting compressed air into the power cylinders of the engine, such arrangement requiring starting air valves and power cylinder air check valves. With this old technique of starting, there was required a large volume of high pressure air supply, typically about 250 pounds per square inch gauge (hereinafter referred to as p.s.i.g.). Such an abundant high pressure air supply was not always available.

The primary purpose of the present invention is to provide an arrangement for starting a two-cycle turbocharged engine without an air supply available above a predetermined pressure level but having available a supply of gas having a pressure below such level.

Another object is to provide means for providing an auxiliary scavenging air supply during starting of a two-cycle turbocharged engine which does not require an abundant high pressure air supply available above a predetermined pressure level but utilizing an available supply of gas having a pressure below such level.

A two-cycle turbocharged engine of the type under consideration in many of its applications is drivingly coupled to a compressor and located in an oil or gas field where a supply of natural gas having a pressure of about 150 p.s.i.g. is abundantly available. Accordingly, another important object of the invention is to provide a gas starting arrangement for a two-cycle turbocharged engine which utilizes such a supply of pressurized natural gas.

Another object is to provide such a gas starting arrangement which is economical and practical when elimination of the air jets at the turbine wheel and the power cylinder air starting valves and air check valves is considered.

Other objects and advantages of the present invention will be apparent from the following detailed description thereof taken in conjunction with the accompanying drawing which illustrates schematically a two-cycle turbocharged engine equipped with a gas starting arrangement constructed in accordance with the principles of the present invention.

Referring to the drawing, a two-cycle turbocharged engine is schematically depicted, being illustrated as including a plurality of power cylinders each designated 10 having an air intake port 11 and an exhaust gas port 12. A piston 13 is shown slidably arranged in each cylinder 10 and connected by a connecting rod 14 to a throw 15 of a crankshaft represented generally by the numeral 16. One end of this crankshaft 16 is shown as having fastened thereto a flywheel 18 on which an externally toothed ring gear 19 is non-rotatively mounted for a purpose explained later herein.

Each of exhaust ports 12 is shown as connected to an exhaust gas manifold 20. An exhaust gas driven turbine 21 is operatively associated with manifold 20 and this turbine drives a shaft 22 on which the impeller of a centrifugal compressor 23 is fastened. Spent exhaust gas is discharged by turbine 21 through a duct 24 which may lead to a muffler (not shown).

Each of air intake ports 11 is shown as connected to an air manifold 25. Compressor 23 draws its air from the atmosphere through an inlet 27. In the normal two-cycle engine the combination of turbine 21 and compressor 23 provides a turbocharger, the air discharge of which is directed to air manifold 25.

In accordance with the concept of the present invention, scavenging air cooling means indicated generally at 26 are provided and are shown as including an air inlet chamber 28 and an air outlet chamber 29. This outlet chamber 29 is shown as connected in fluid conducting communication with air manifold 25. The outlet of compressor 23 is shown as connected in fluid conducting communication with cooler inlet chamber 28 via a conduit 30. A check valve 31 of any suitable construction is shown provided in conduit 30 and is arranged to permit flow of air toward inlet chamber 28. Cooler 26 may be of any suitable construction and is shown schematically as providing for the flow of air from inlet chamber 28 to outlet chamber 29 in heat exchange relation with a coolant such as cooling water which flows through passage 37.

In order to provide initial scavenging air or an auxiliary scavenging air supply during engine startup, there is provided in accordance with the present invention an air blower 32 of any suitable construction and preferably of the positive displacement type. This air blower 32 draws air from the atmosphere through an inlet duct 33 and discharges it into an outlet duct 34 which is connected in fluid conducting communication with inlet chamber 28. Another check valve 35 of any suitable construction is shown arranged in duct 34 and is operative to permit the flow of air toward inlet chamber 28.

A gas motor 36 is shown as provided for driving the rotative elements of positive displacement air blower 32. Gas motor 36 is supplied with drive gas through an inlet line or pipe 38 shown as having a pressure regulator 39 operatively arranged therein. Spent drive gas is exhausted from gas motor 36 and discharged through a discharge line or pipe 40.

An engine cranking gas motor 41 of any suitable construction is shown as having its drive pinion 42 engaging ring gear 19. This starting motor 41 is shown as supplied with drive gas through an inlet line or pipe 43 and spent drive gas is discharged from this motor through a discharge line or pipe 44.

The upstream ends of gas supply lines 38 and 43 are connected to a source (not shown) of gas which has a pressure, say, about 150 p.s.i.g., but below that pressure which is normally employed to start a conventional two-cycle turbocharged engine. The gas supplied to inlet pipes 38 and 43 may be compressed air but in many installations of an engine of the type under consideration, such as on offshore platforms and at other engine-compressor station locations, there is usually available an abundant supply of pressurized natural gas having a pressure of about 150 p.s.i.g.; and it is a feature of the present invention that such natural gas supply may be utilized for providing the auxiliary scavenging air supply during initial engine startup and also for cranking the engine while such auxiliary scavenging air is being supplied to the engine. When inlet pipes 38 and 43 are connected to a natural gas supply, the motor discharge pipes 40 and 44 are extended to vent the spent drive gas to the atmosphere at a safe level.

In an actual test, it was found that a continuous gas supply having a pressure of about 150 p.s.i.g. connected to starting motor inlet pipe 43 produced a sufficient cranking speed to start the engine. During such test, it was also found that the pressure regulator 39 in air blower motor inlet line 38 could be adjusted to produce a drive gas for such motor at a pressure falling in the range of from about 65 to about 85 p.s.i.g. to provide sufficient torque to operate the blower against a six-inch mercury scavenging pressure.

It will be seen that the normal main scavenging air supply conducted through duct 30 when the engine is self-sustaining and the auxiliary scavenging air supply conducted through duct 34 during engine startup are arranged in parallel to each other, and that the check valve 31 provides means for preventing flowback of such auxiliary scavenging air through the turbocharger 21–23 and further that the check valve 35 prevents flowback of such main scavenging air through air blower 32 when the engine is self-sustaining.

From the foregoing, it will be seen that the embodiment illustrated and described accomplishes the stated objects. Since modifications in the apparatus may occur to those skilled in the art without deviating from the inventive concept, it is intended that the scope of the present invention be limited only by the appended claims.

What is claimed is:

1. A two-cycle engine including an exhaust gas driven turbocharger for supplying scavenging air to engine cylinders when the engine is self-sustaining: characterized by the combination therewith of a positive displacement type auxiliary air blower for supplying auxiliary scavenging air to the engine cylinders for starting the engine; separate conduit means for conveying the turbocharger air and the auxiliary air to a common manifold; check valve means in each of said conduit means, upstream of said manifold, for preventing backflow of air from said manifold; a gas driven motor drivingly coupled to said air blower, adapted for connection to a source of pressurized gas independent of said engine; and a second gas driven motor drivingly coupled to the engine for turning over the engine, adapted for connection to a source of pressurized gas independent of said engine.

2. A two-cycle engine as set forth in claim 1 including a common supply conduit for supplying drive gas to both of said gas driven motors; and regulator means for reducing the pressure of drive gas supplied to said blower gas motor to a value below that of the gas supplied to said engine gas motor.

References Cited

UNITED STATES PATENTS

| 1,893,127 | 1/1933 | Buchi | 60—13 |
| 2,011,336 | 8/1935 | Gregg. | |
| 2,773,348 | 12/1956 | Grieshaber | 60—13 |
| 2,953,127 | 9/1960 | Adams. | |
| 3,174,275 | 3/1965 | Collin. | |

FOREIGN PATENTS

| 509,285 | 7/1939 | Great Britain. |

CARLTON R. CROYLE, *Primary Examiner.*

D. HART, *Assistant Examiner.*

U.S. Cl. X.R.

123—179